June 18, 1946.　　　　R. B. SMITH　　　　2,402,459
SUBMARINE AND SHIP DETECTOR USING REFLECTED RADIO WAVES
Filed Feb. 3, 1943　　　3 Sheets-Sheet 1

INVENTOR:
RONALD B. SMITH,
BY
His ATTORNEY.

June 18, 1946.  R. B. SMITH  2,402,459
SUBMARINE AND SHIP DETECTOR USING REFLECTED RADIO WAVES
Filed Feb. 3, 1943  3 Sheets-Sheet 2

INVENTOR:
Ronald B. Smith,
BY
H. Swenarton,
His ATTORNEY.

June 18, 1946. R. B. SMITH 2,402,459
SUBMARINE AND SHIP DETECTOR USING REFLECTED RADIO WAVES
Filed Feb. 3, 1943 3 Sheets-Sheet 3
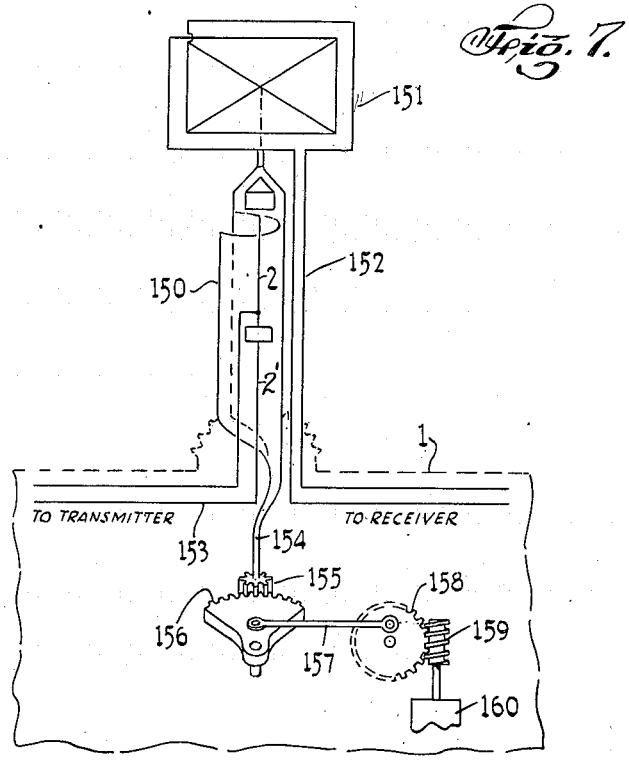
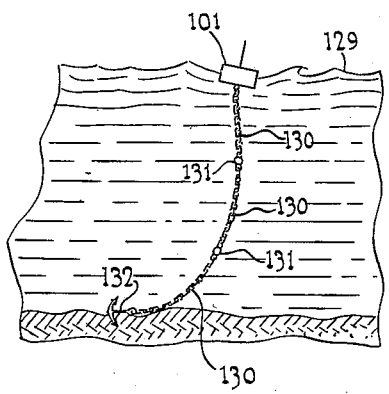
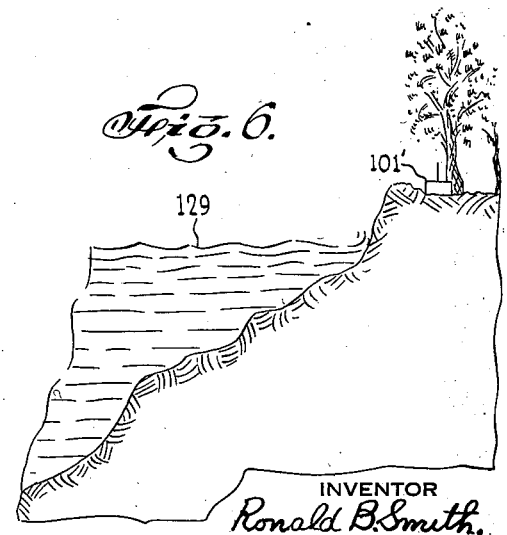
INVENTOR
Ronald B. Smith,
BY
H. K. Swenarton,
His ATTORNEY Patented June 18, 1946

2,402,459

UNITED STATES PATENT OFFICE 2,402,459

SUBMARINE AND SHIP DETECTOR USING REFLECTED RADIO WAVES

Ronald B. Smith, East Orange, N. J.

Application February 3, 1943, Serial No. 474,542

16 Claims. (Cl. 250—1)

1

This invention relates to an apparatus and method for the effective detection of ships, planes, tanks and other objects, for example surfaced submarines, by the utilization of ultra high frequency waves emitted from a known source, such as one of a series of anchored buoys or strategically located land stations, and reflected back to such source by the conducting surface of the detected target, even though at a considerable distance away, for the purpose of automatically actuating a signalling means and thereby emitting a pre-determined signal, such as a code radio message or signal light, that can be picked up by a central station ashore, afloat or aloft, from which a vessel, plane, tank destroyer or the like can be then dispatched to attack or inspect the object so detected. Other objects of the invention are hereinafter set forth.

Heretofore, as I am well aware, it has been proposed as set forth in Patent No. 1,426,337, issued August 15, 1922, to provide submarine detecting means which included a buoy, normally held in a state of submergence by a cable, which was responsive to a change in depth and adapted to be rendered operative, when released, as it ascended through the water in which it was submerged. It has also been proposed, as set forth in Patent No. 1,150,799, issued August 17, 1915, to provide means for signalling the approach of a ship or like object, which included a submerged electrically generated magnetic field, adapted to be influenced by the approach thereto of a magnetic metal body, and a signalling instrument associated with the said magnetic field and adapted, upon the disturbance of such field to emit a signal. The effective range of such detecting devices is extremely short, as is apparent. The inclusion of devices, such as disclosed in these two patents, within the scope of the appended claims is accordingly specifically disclaimed.

The invention will be more fully understood from the following detailed description and drawing forming a part thereof, in which Figure 1 is a diagrammatic view of one form of the invention;

Fig. 5 is a diagrammatic sectional view showing the manner of anchoring the buoy containing the transmitter to the ocean bottom;

Fig. 6 is a diagrammatic view showing the source of the ultra high frequency waves at a shore installation; and Fig. 7 is essentially a diagrammatic view of a still further modification wherein the antenna is partially enveloped by a directional reflecting shield.

Figure 1:
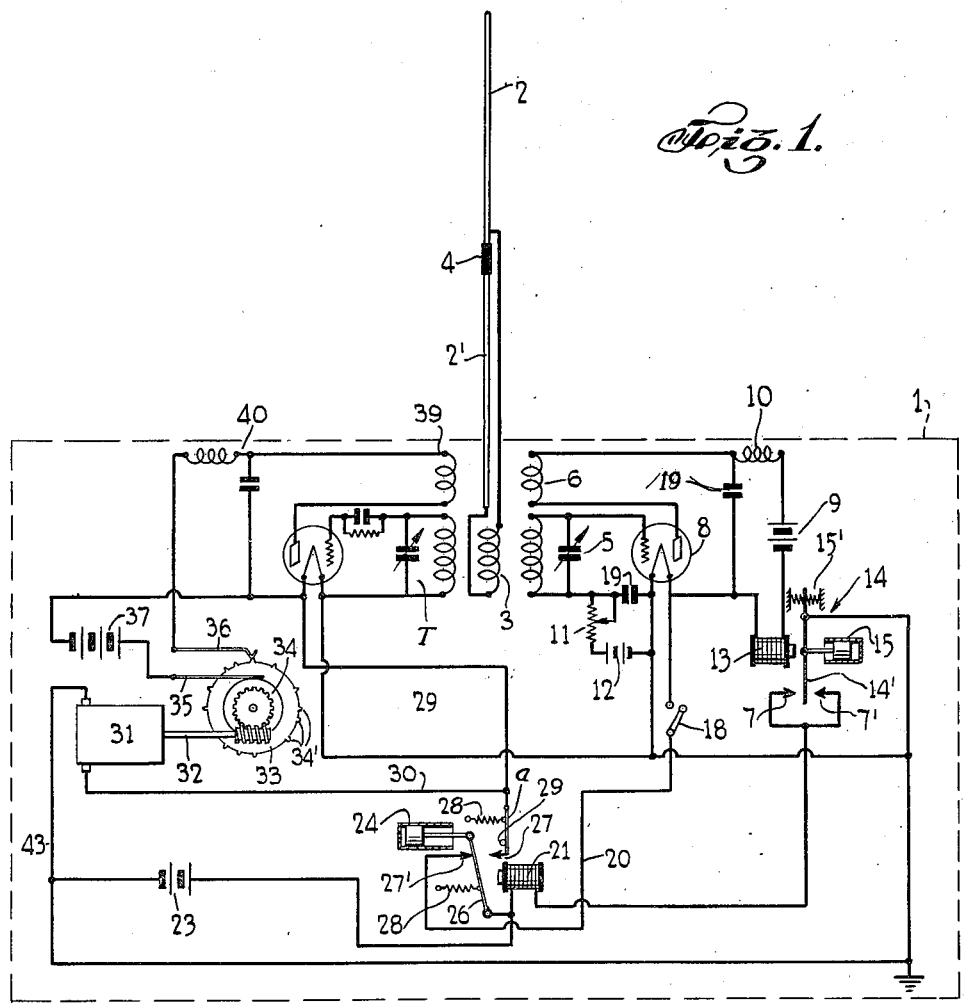
Figure 2:
Fig. 2 is an essentially diagrammatic view of the buoy employed and a target submarine, the latter being shown with its axis alined with the path to the buoy merely to better illustrate the same, though desirably it should be broadside to the said path for most effective detection.

Referring to the drawing and the construction shown therein, the reference numeral 1 designates a waterproof casing or shell which if employed as a buoy is so designed as to float awash with the greater part thereof invisible. A di-pole antenna 2, 2' is connected to an inductance member 3 which is attached thereto below the insulating separator 4. The detecting signal to be transmitted from the antenna is induced in the inductance 3 by a combined receiving and transmitting unit of conventional type comprising variable grid condenser 5, with its associated inductance, the plate inductance 6, opposing contacts 7, 7', constituting one terminal of the primary circuit of a relay hereinafter referred to, and a radio tube 8 of the oscillator-receiver type whose grid and plate elements are respectively directly connected to one terminal of said variable condenser and to one terminal of said plate inductance respectively. One terminal of a plate battery 9 is connected, via the frequency choke 10 to the other terminal of the plate inductance. A variable resistor 11 is interposed in one lead of a bias battery 12 that is connected to one terminal of the grid element of the tube 8. One end of the primary circuit of a relay 13 is connected to the other terminal of said grid and to the plate inductance 6, respectively, while the other terminal of the primary circuit of said relay is connected to the inductance 6 at a point intermediate the same and the choke 10. A grounded lead 14 is connected to the pivotally mounted fulcrum of the armature 14' of said relay, which armature is pivotally connected to the piston of a dash-pot 15 of conventional type that serves to prevent sudden rocking movements of the armature responsive to any wave actions on the buoy. Oppositely acting coil springs 15' serve to normally maintain the armature 14' in a central position between said contacts 7 and 7'.

The reference numeral 18 designates the main switch that is interposed in the filament circuit and the reference numerals 19 and 19' designate fixed or by-pass condensers.

A calling or code transmitter T, of conventional type, is inductively coupled, as shown, to the inductance 3, the same constituting the current supply line 20 that is controlled by said switch 18, a second relay 21 whose primary circuit is respectively connected to one lead of a storage battery 23 and to said opposing terminal contacts 7 and 7' and which relay in conjunction with relay 13 controls the operation of the code transmitter. A second dash-pot 24 whose plunger is povotally connected to the armature 26 of said relay 21, which armature is adapted to alternately engage contacts 27 and 27' carried by the pivotally and yieldably mounted arm $a$ and one lead of said switch 18, respectively. The coil springs 28 serve respectively to normally hold the armature 26 against contact 27' and the arm $a$ against the stop 29. Said dash-pot preferably is so designed that once contact is made between the armature 26 and contact 27 the return movement of the armature, following the breaking of the circuit through the coil 21 requires about one to five minutes for its completion. The line 29 connects the arm $a$ with the filament of the code transmitter T and said line 29 is also connected, through line 30 to motor 31 which drives wormshaft 32 that in turn drives a disk 33 which has a contact hub or ring 34 and carries a series of peripherally disposed contact elements 34' electrically connected to said ring 34. Brushes 35 and 36 respectively co-operate with the ring contact 34 and the contacts 34', the latter serving to periodically interrupt the current transmitted by such brushes to the plate circuit of transmitter T and thereby to effect the transmission of the pre-selected code message. The "B" battery 37 supplies current to the plate of transmitter T and a conventional combined radio frequency choke and fixed condenser unit 40 serves to by-pass the high frequency plate current around "B" battery 37. As is of course evident, other types of "B" batteries may be employed if desired.

Assuming the parts are in the normal inoperative position shown in Fig. 1 then, to operate the apparatus, the switch 18 is closed and thereupon the oscillator 8 emits short wave signals of high frequency, desirably between about 30 and 300 megacycles or even more, corresponding to wave lengths of from 10 meters to one meter or even less, but in any event of such a frequency as will accomplish the most effective transmission of the reflected wave from the particular target depending upon its size and distance from the transmitter. Each wave so transmitted, upon striking the conducting surface of the target, such for example as that of an emerged submarine, will be instantly reflected back to its source and picked up by the di-pole antenna 2, 2'. Since it will of necessity be either in phase or out of phase with the sending signal, according to the time required to travel to and from the target, such reflected wave so received will cause a fluctuation in the plate circuit of tube 8 and a corresponding fluctuation in the current passing through the relay 13, thereby affecting the normal balance of armature 14'. Any increase in the plate circuit will cause the magnet of relay 13 to attract the armature 14', resulting in its movement to the left and into engagement with contact 7, while any decrease in such plate circuit current, as a result of the unbalancing of the springs, will admit of said armature moving to the right and engaging contact 7'. In either case, whether the armature engages the contact 7 or 7', the battery circuit through one terminal of battery 23, conductor 14, armature 14', contact 7 or 7', relay 21 and thence through the other battery terminal, will be completed. The magnet of relay 21, now magnetized, attracts the armature 26 and breaks its contact with contact 27', thus disconnecting transmitter 8; and it immediately engages contact 27, thereby closing the circuit of the battery 23 through conductor 30, motor 31, conductor 29 and the tube filament of the transmitter T, which latter then emits the calling signal. It is desirable that such signal be on a longer wave length than that of the detector transmitter. Furthermore, the dots and dashes or other identifying means on the disk 33 with which such signal conforms are identified on a master chart (not shown) at the central station or patrol station, each buoy or other detecting unit being desirably assigned a different code message.

Figure 3:
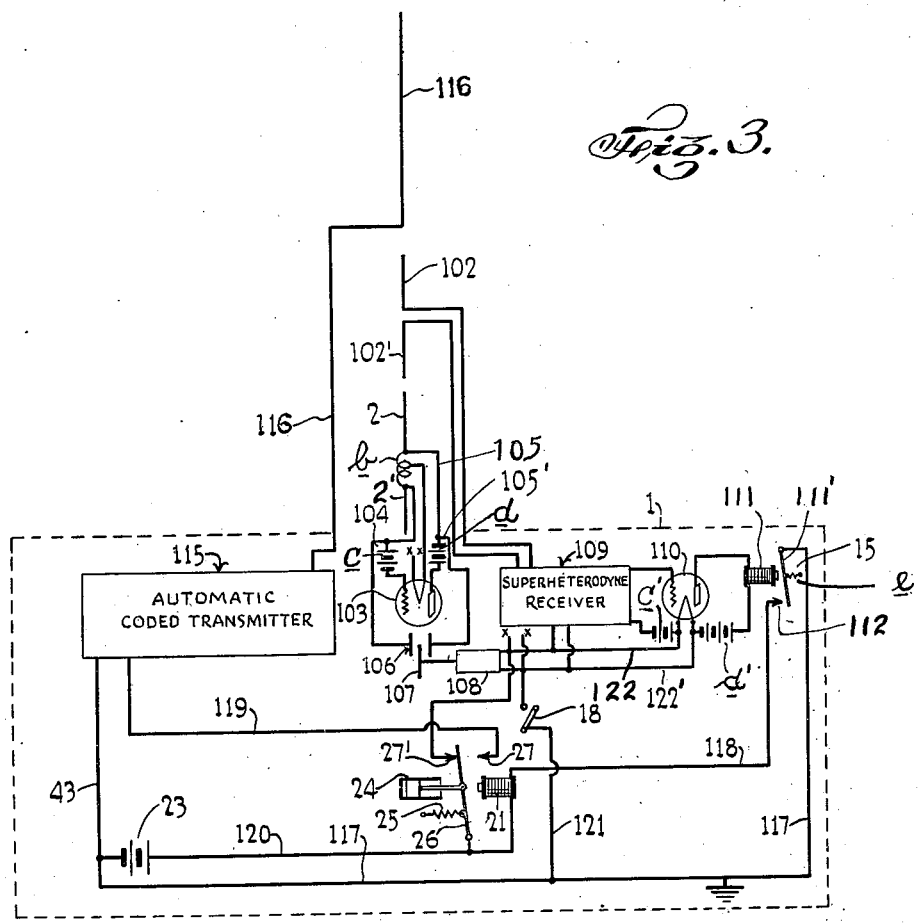
Fig. 3 is a diagrammatic view of a modified form of the invention.
Figure 4:
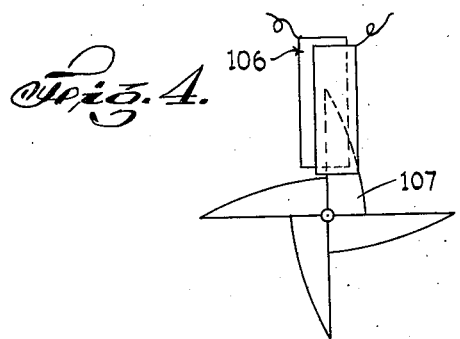
Fig. 4 is a diagrammatic detail elevation of the rotary variable condenser employed in one form of the invention.

In the modified form of apparatus shown in Fig. 3, a separate detecting transmitter and a separate detecting receiver are employed instead of the combination receiver and transmitter shown in Fig. 1. In this construction 2, 2' designate a di-pole antenna, the upper and lower halves of which are coupled by an inductance $b$ whose ends are connected through a grid bias battery $c$ to the grid and, through the plate battery $d$, to the plate of a transmitter tube 103 whose filament is in turn connected to such antenna at approximately the middle thereof. Said inductance is connected by leads 105, 105', in shunt, with a rotary variable condenser 106 and a rotor plate element 107 mounted therebetween which is adapted to be continuously rotated by a motor 108 to thereby continually vary the length of the wave transmitted by the tube 103 and thus render it possible to produce a desired pre-determined variation in wave length in oscillator tube 103. The filament of tube 103 is supplied from lines 122, 122' (connections not shown).

A receiver 109 of any suitable type, desirably a superheterodyne receiver, picks up the wave that is reflected from the target and is received by a second di-pole antenna 102, 102' and such wave after amplification, is detected by detector tube 110. The latter has a grid bias battery $c'$ and a plate-supply "B" battery $d'$, the circuit of the latter battery being completed through a relay 111, whose armature 111' is normally maintained out of engagement with a terminal contact 112 by the spring $e$.

An automatic coded transmitter 115, generally corresponding to the transmitter T, except that it is equipped with its own individual antenna 116 instead of utilizing, as in the case of transmitter T, the same antenna as that by which the detecting signals are transmitted and to which, as shown in Fig. 1, it is coupled by an inductance. The line 43 and grounded line 117 respectively connect one terminal of the battery 23 to the coded transmitter 115 and to the armature 111' of relay 111, while the lines 118 and 119 respectively connect the lead 120 from the other terminal of the battery 23 with contact 112, via the coil of relay 21, and with the coded transmitter 115, via the armature 26 and contact 27 of relay 21. The line 121 connects the line 117 with switch 18. The motor leads 122 and 122' are respectively connected to dissimilar poles of batteries $c'$ and $d'$ and these leads are also respectively connected to receiver 109 and filament of tube 110.

In order to operate the modified form of my invention illustrated in Fig. 3, the switch 18 is closed and thereupon the oscillator or transmitting tube 103 will deliver an ultra short wave signal to the antenna 2, 2' which will be continuously transmitted thereby. This wave, upon meeting a conducting surface such as the metal hull of a surfaced submarine or that of a plane or tank, will be immediately reflected back and picked up by the receiving antenna 102, 102', whereupon it will be amplified in the receiver 109 and detected by the tube 110. If no signal is reflected, the amount of energy picked up by the antenna 102, 102' from antenna 2, 2' will not operate the relay 111 even if so detected by tube 110 because the signal contains no beat note. On the other hand, since the wave length of the signal being constantly emitted from tube 103 is being constantly varied by the rotary variable condenser 106, any reflected signal received by the di-pole antenna 2, 2' are picked up by antenna 102, 102' and consequently, due to the homodyning of the sending and received signals in the receiver 109, a "beat" note corresponding to the differential between these signals will be detected by the detector tube 110, thereby resulting in a surge of current in relay 111 and the attraction of the armature 111' to the core thereof with the resultant closing of the circuit through contact 112 and through relay 21 and the consequent cutting off of the current supply to the transmitter 103, the filament of whose tube is supplied from lines 122 and 122' (connections indicated but not shown in Fig. 3), and also to receiver 109, motor 108 and detector tube 110. Simultaneously, the closing of the circuit through line 120, armature 26, floating contact 27, line 119 and transmitter 115 will be effected. Thereupon, the circuit through relay 21 will be completed in the same manner as previously explained in connection with the form of the invention shown in Fig. 1 and the current supply to transmitter 103, receiver 109, motor 108 and detector 110 will be cut off, while at the same time the circuit will be closed through line 120, armature 26, contact 27 and line 119 which feeds the automatic coded transmitter 115. In both forms of the invention shown in Figs. 1 and 3, the breaking of the circuit through contact 27' and armature 26 results in the instantaneous de-energizing of the magnet of relay 21 and hence armature 26 commences to return slowly from its extreme position at the right, as viewed in Figs. 1 and 3, and moves toward the contact 27'. However, since contact 27 is a floating contact, it follows the armature 26 and retains contact therewith throughout a major part of its return movement toward contact 27' and since such return movement is slowed up by the delaying device or dash-pot 24, preferably so as to require several minutes for the completion thereof, the automatic coded transmitter will continue to operate throughout the period that the contact 27 remains in engagement with the armature 26 which is ample to admit of a large number of repetitions of the complete call so transmitted being received at the listening post, whether it be ashore, afloat or aloft. The instant the armature 26 again engages the contact 27', the current supply to the coded transmitter will be cut off and the parts of the apparatus will be in a position to receive the same or another reflected signal from a ship, plane, tank or other object.

As illustrative of the "beat" note which is obtained with the form of the invention shown in Fig. 3, let it be assumed that a wave of 30 megacycles—about ten meters—is being transmitted by transmitter 103 with a variation of 10% or 3 megacycles being produced therein by variable condenser 106 then, assuming a motor speed of 1800 R. P. M., the four vanes of the variable condenser will produce variations at the rate of 7,200 per minute or 120 per second which is equivalent to 360 megacycle sweeps per second. Since radio waves travel approximately 300,000,000 meters per second, a radio wave of the above character would travel to and from an object 50 meters away in 1/3000000 of a second, during which interval the frequency would change 120 cycles, producing a "beat" note of this frequency. The foregoing calculations are merely illustrative as in practice higher transmitting frequencies might be found to be more desirable to secure best reflection results.

In Figure 5, the reference numeral 129 indicates the body of water in which is moored the buoy 101 containing my improved detecting and transmitting mechanism above described, 130 the links of the mooring chain, 131 intermediate float elements and 132 the anchor to which said chain is attached.

In Figure 6 the detecting and transmitting mechanism 101' is shown mounted on the shore at an elevation above the water of the ocean or bay 129 in which the submarines or vessels to be detected may be lurking.

Referring to the construction illustrated in Fig. 7, wherein the aerial is equipped with a directional reflector, the reference numeral 150 designates such a reflector, 151 a loop antenna, 152 and 153 the leads therefrom to the receiver and transmitter, respectively, both of which may be of the construction disclosed in Fig. 1. Said reflector and loop antenna are caused to oscillate to-and-fro by gearing connected to shaft 154, the same including pinion 155 carried by said shaft, gear quadrant 156, that is independently mounted on a stub-shaft, link 157, gear 158, also independently mounted, worm-shaft 159 and motor 160. As is evident, when the directional reflector is employed the same is manually set in a position to best reflect the waves in the particular direction in which the submarine or other object to be detected is likely to be lurking.

My improved detecting system for spotting submarines and other objects such as herein specified, being automatic in operation, is always "on the alert" and since physical contact between the object to be detected and a cable or net associated with the buoy plays no part in the operation of my apparatus the range of detection is far greater than in those cases wherein such physical contact is required.

In some instances, particularly if the series of buoys associated with a central patrol station are so closely distributed as to set up interferences therebetween, it may be desirable to provide each buoy installation with a wave filter adapted to filter out all signals having a wave length or "beat" note different from that on which the receiving set of each buoy is designed to operate, in order to prevent interference or jamming between the signals received by the different radio receiving sets of such series of buoys.

The arrangement of apparatus illustrated in the drawing is to be understood as being essentially schematic and merely for the purpose of illustration of the principles involved as well as the manner of assembly of well known apparatus to secure the application of such principles to the detection of submarines and like objects in accordance with my invention.

Various changes in the construction and method herein set forth may be made without departing from the spirit of my invention as embraced within the scope of the appended claims.

Having thus described my invention, what I claim is:

1. In the method of automatically detecting the presence of submarines, planes or other object having an electrically conductive surface the detection of which is desired, the steps which comprise projecting an ultra short wave radio signal against such surface of the object to be detected, picking up the radio signal reflected from such surface at strategically located detecting station, causing the signal so received to effect the transmission of a radio signal characteristic of such station and observing such latter signal at a distant central station.

2. In the method of automatically detecting the presence of submarines, planes or other object having an electrically conductive surface the detection of which is desired, the steps which comprise projecting a plurality of ultra short wave radio signals, each from a different one of a series of strategically located detecting stations distant from each other, picking up at one of such stations the signal originating therefrom and which has been reflected back thereto from such conductive surface of the object detected, and causing reflected signal to effect the operation of a different signal that is characteristic of the station at which such reflected signal has been so picked up.

3. In the method of automatically detecting the presence of submarines, planes or other object having an electrically conductive surface the detection of which is desired, the steps which comprise projecting a plurality of ultra short wave radio signals, each from a different one of a series of strategically located radio transmitting stations, picking up at one of said stations the radio signal originating therefrom and which has been reflected back thereto from such conductive surface of the object detected and causing the reflected signal to effect the transmission of a radio signal which is characteristic of the particular station which picked up said reflected signal.

4. In the method of automatically detecting submarines, planes or other object having an electrically conductive surface the detection of which is desired, the steps which comprise projecting a plurality of ultra short wave radio signals, each from a different one of a series of strategically located radio transmitting stations, picking up at one of said stations the signal originating therefrom and which has been reflected back thereto from such conductive surface of the object detected, amplifying and detecting such signal and then causing the detected signal to effect the broadcasting of a radio signal characteristic of such station.

5. In the method of detecting an object having an electrically conductive surface, the step which consists in causing a radio signal transmitted from and reflected back to a strategically located radio station from such conductive surface to effect the operation of an automatic signal which is characteristic of such station.

6. In an apparatus for detecting the presence of a submarine, plane or other object having an electrically conducting surface, the combination comprising a strategically located detecting station equipped with a radio transmitter and sending and receiving antenna means and also with a radio receiving set, a second radio transmitter independent of the other transmitter and means for causing a radio signal originally emanating from the first transmitter reflected back from such conductive surface to the receiving set to automatically effect the operation of the second transmitter and transmit a radio signal characteristic of that particular detecting station.

7. In an apparatus for detecting the presence of a submarine, plane or an object having an electrically conductive surface, the combination comprising a strategically located detecting station equipped with a radio transmitter and sending and receiving antenna means and also with a radio receiving set and means for causing a radio signal originally emanating from the said transmitter and reflected back from such conductive surface to effect the operation of an automatic signal associated with and characteristic of said detecting station.

8. In an apparatus for detecting the presence of a submarine, plane or an object having an electrically conductive surface, the combination comprising a strategically located detecting station equipped with a radio transmitter, sending and receiving antenna means, a radio receiving set also connected with said antenna means, a second transmitter, automatic keying means for insuring the emission by such latter transmitter, when operated, of a signal characteristic of such detecting station, and means for automatically setting the latter transmitter in operation upon the reception by said receiving set of a signal originally emanating from the first transmitter and reflected back from such conductive surface.

9. In an apparatus for detecting the presence of a submarine, plane or other object having an electrically conductive surface, the combination comprising a strategically located detecting station, antenna means carried thereby, an ultra short wave radio transmitter connected to said antenna means, a radio receiving set associated with such station and means, including a local source of electricity, for effecting the emission from said station of an automatic repeating signal characteristic of such station upon the reception by said receiving set of a reflected radio signal which originally emanated from said transmitter and has been reflected from the surface of the detected object.

10. In an apparatus for detecting the presence of a submarine, plane or other object having an electrically conductive surface, the combination of a plurality of strategically located detecting stations, each equipped with radio antenna means, an ultra short wave radio transmitter, a radio receiving set, and automatic means for emitting a signal characteristic of the particular station from which it is emitted upon the reception by the receiving set at such station of a radio signal reflected from the surface of a detected object and which was originally emitted by the radio transmitter of that particular station.

11. In an apparatus for detecting the presence of a submarine, plane or other object having an electrically conductive surface, the combination with a strategically located detecting station of antenna means, an ultra short wave radio transmitter connected thereto, means for producing a continual variation in the wave length of the radio signal transmitted by said transmitter, a radio receiving set of the superheterodyne type adapted to homodyne the signal transmitted from said transmitter and the reflected signal from the surface of a detected object and produce a "beat" note which will be detected by the detector tube of such receiver and means responsive to a "beat" note so produced in said detector tube for automatically effecting the emission of a signal characteristic of such detecting station.

12. In an apparatus for detecting the presence of a submarine, plane or other object having an electrically conductive surface, the combination with a strategically located detecting station of antenna means, an ultra short wave radio transmitter connected to the latter, means for continually producing a variation in the wave length of a radio signal being transmitted by said transmitter, a radio receiving set of the superheterodyne type adapted to homodyne the signal transmitted from said transmitter and the signal resulting from its reflection from the surface of a detected object and thereby produce a "beat" note which can be detected in the detector tube of such receiver, a second transmitter including automatic keying means therefor and means responsive to a "beat" note produced in said receiver for actuating said second transmitter and the said keying device and effecting the transmission by said antenna means of a radio signal characteristic of said station.

13. In the method of detecting the presence of a submarine, a plane or other object having a metallic electrically conductive surface, the steps which comprise transmitting from strategically located detecting station an ultra short wave radio signal of continually varying wave length, against a conducting surface of the object whose detection is desired, picking up the wave reflected from such surface at the sending source of such radio signal, homodyning the transmitted and reflected waves to produce a "beat" note and causing the resultant current impulses to effect the automatic transmission from said station of a radio signal characteristic thereof.

14. In an apparatus for detecting the presence of a submarine, plane or other object having an electrically conductive surface, the combination comprising a floating buoy strategically located on a body of water, the same being equipped with radio antenna means which project above the surface of such water and the principal portion of said buoy being submerged in such water, a radio transmitter adapted to transmit ultra short wave radio signals from said antenna to an object to be detected, means including a rotary variable condenser so associated with such transmitter as to effect the continual variation in wave length of the signals emanating from said transmitter, a radio receiving set also carried by said buoy and capable of homodyning the signal sent out from said transmitter and the reflected signal from the surface of an object to be detected which is received by said antenna means, a second radio transmitter equipped with automatic keying means that limit the signal emanating from such transmitter to a signal characteristic of that particular buoy, a relay having a balanced, highly sensitive armature, said armature being responsive to surges of current in such coil, a local source of electricity for supplying current to the two transmitters, the receiver and said keying means and said relay, a second relay controlling the operation of the second transmitter and its keying means whose primary circuit is operatively associated with the armature of the first relay and adapted to be periodically opened and closed by the movements of such armature, said second relay having an armature which normally is in such a position as to prevent the operation of the second transmitter, means associated with said latter armature for delaying the movement thereof in one direction and thereby preventing the sudden interruption of the operation of the second transmitter and means serving to electrically energize the primary circuit of the second relay of said relay and effect the operation of the second transmitter when a surge of current in the coil of the first relay effects the unbalancing of its armature.

15. In an apparatus as claimed in claim 7, wherein means are provided for continually varying the wave length of the signals transmitted by the radio transmitter.

16. In an apparatus as claimed in claim 7, wherein the antenna means is equipped with a directional device.

RONALD B. SMITH.